(12) United States Patent
Reichert et al.

(10) Patent No.: US 11,897,329 B2
(45) Date of Patent: Feb. 13, 2024

(54) ELECTROMECHANICAL DRIVE ARRANGEMENT FOR A MOTOR VEHICLE

(71) Applicant: Schaeffler Technologies AG & Co. KG, Herzogenaurach (DE)

(72) Inventors: Andrea Reichert, Emskirchen (DE); Martin Dressel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 545 days.

(21) Appl. No.: 17/260,278

(22) PCT Filed: Aug. 7, 2019

(86) PCT No.: PCT/DE2019/100713
§ 371 (c)(1),
(2) Date: Jan. 14, 2021

(87) PCT Pub. No.: WO2020/030228
PCT Pub. Date: Feb. 13, 2020

(65) Prior Publication Data
US 2021/0291648 A1    Sep. 23, 2021

(30) Foreign Application Priority Data

Aug. 10, 2018    (DE) ...................... 10 2018 119 486.2

(51) Int. Cl.
*B60K 17/12*    (2006.01)
*B60K 1/00*    (2006.01)
(Continued)

(52) U.S. Cl.
CPC ............... *B60K 17/12* (2013.01); *B60K 1/00* (2013.01); *B60K 17/02* (2013.01); *B60K 17/26* (2013.01);
(Continued)

(58) Field of Classification Search
CPC .......... B60K 17/12; B60K 1/00; B60K 17/02; B60K 17/26; B60K 2001/001; B60K 2025/005
(Continued)

(56) References Cited

U.S. PATENT DOCUMENTS 10,744,865 B2 * 8/2020 Janson ..................... B60K 6/40
10,767,738 B2 * 9/2020 Stolz ....................... F16H 61/12
(Continued)

FOREIGN PATENT DOCUMENTS

DE    102010031156 A1    1/2012
DE    102012010171 A1    11/2013
(Continued)

*Primary Examiner* — Ha Dinh Ho (57) ABSTRACT

An electromechanical drive arrangement for a motor vehicle includes an electromechanical main drive motor, a reduction gear unit comprising a gear input, a gear output, at least one reduction stage and a gear housing that houses the reduction stage, an axle differential gear for branching the drive power guided over the reduction stage into a first wheel drive train section and a second wheel drive train section, and an auxiliary unit that can be driven by the main drive motor via the reduction stage. At least parts of the auxiliary unit are integrated into the gear housing. A switching body is provided in the gear housing such that the drive connection from the reduction stage to the axle differential gear can be switchably closed and switchably separated.

18 Claims, 4 Drawing Sheets

(51) Int. Cl.
   *B60K 17/02*   (2006.01)
   *B60K 25/00*   (2006.01)
   *B60K 17/26*   (2006.01)

(52) U.S. Cl.
   CPC .. *B60K 2001/001* (2013.01); *B60K 2025/005* (2013.01)

(58) Field of Classification Search
   USPC ........................................................ 74/661
   See application file for complete search history.

(56)              References Cited

U.S. PATENT DOCUMENTS

| | | | |
|---|---|---|---|
| 10,821,822 B2 * | 11/2020 | Roske | B60K 6/40 |
| 10,935,111 B2 * | 3/2021 | Lindenmaier | H02P 6/04 |
| 11,312,218 B2 * | 4/2022 | Serrao | B60K 17/02 |
| 2010/0261565 A1 * | 10/2010 | Ai | B60K 6/445 |
| | | | 477/3 |
| 2012/0221197 A1 | 8/2012 | Hisada et al. | |
| 2012/0247269 A1 | 10/2012 | Horie | |

FOREIGN PATENT DOCUMENTS

| | | |
|---|---|---|
| DE | 112013003274 T5 | 4/2015 |
| EP | 3176019 A1 | 6/2017 |
| JP | 2010178403 A | 8/2010 |
| JP | 2012029369 A | 2/2012 |
| WO | 2012117623 A1 | 9/2012 |
| WO | WO2012132094 A1 | 10/2012 |
| WO | 2013170848 A1 | 11/2013 |

\* cited by examiner

|  | Electric motor is driving | Electric motor is being driven (generator operation) | Electric motor stopped |
|---|---|---|---|
| Vehicle is stationary | 1 Driving | 2 Recuperation/ battery charging | 3 Coasting |
| Vehicle stationary | 4 Stationary air conditioning | - | 5 Stationary/parking |

| T2 | | Switching element | | |
|---|---|---|---|---|
| | | S1 | S2 | S3 |
| Operating condition | 1 | Off | On/Off | Off/On |
| | 2 | Off | On | Off |
| | 3 | On | On | Off |
| | 4 | On | Off | On |
| | 5 | On/Off | On/Off | On/Off |

Fig. 4

ELECTROMECHANICAL DRIVE ARRANGEMENT FOR A MOTOR VEHICLE

CROSS-REFERENCE TO RELATED APPLICATIONS

This application is the U.S. National Phase of PCT Appln. No. PCT/DE2019/100713 filed Aug. 7, 2019, which claims priority to DE 10 2018 119 486.2 filed Aug. 10, 2018, the entire disclosures of which are incorporated by reference herein.

TECHNICAL FIELD

The disclosure relates to an electromechanical drive arrangement for a motor vehicle having an electromechanical main drive motor provided for driving the motor vehicle, which comprises a rotor and a stator, a reduction transmission device which is kinematically coupled to the rotor, an axial differential transmission for splitting the drive power present at the output of the reduction transmission device between a first and a second wheel drive train section and at least one auxiliary assembly, for example in the form of a power steering pump, an air conditioning compressor or a pump for a coolant circuit guided by means of a battery assembly, wherein that auxiliary assembly can be driven via the main drive motor.

BACKGROUND

An electromechanical drive arrangement of the type mentioned above is known from DE 10 2012 010 171 A1. In this known drive arrangement, the main drive motor consists of two coaxially joined sub-motors, the outputs of which are guided to two separate inputs of an epicyclic gear. The auxiliary assembly provided in this drive arrangement is arranged to be coaxial with the axis of the inner sub-motor and is kinematically coupled to the rotor thereof.

SUMMARY

It is desirable to create an electromechanical drive arrangement for a purely electrically operated motor vehicle, which is characterized by an advantageously realizable overall structure and which can be operated advantageously from an energetic point of view.

An electromechanical drive arrangement for a motor vehicle has:
  an electromechanical main drive motor comprising a rotor and a stator,
  a reduction transmission device which comprises a transmission input, a transmission output, at least one reduction stage and a transmission housing which accommodates the reduction stage,
  an axial differential transmission for splitting the drive power, which is guided by means of the reduction stage, between a first and a second wheel drive train section, and
  an auxiliary assembly which can be driven by the main drive motor by means of the reduction stage, wherein the auxiliary assembly is at least partially incorporated into the transmission housing,
  a switching element is provided in the transmission housing,
  the switching element is designed and incorporated into the drive arrangement in such a way that the drive connection from the reduction stage to the axial differential transmission can be closed in a switchable manner and can be disconnected in a switchable manner by means of said switching element.

This makes it possible in an advantageous manner to create a drive arrangement for a purely electromechanically operated motor vehicle, in which the auxiliary assembly can be driven via the reduction transmission when the vehicle is stationary.

The switching element and the auxiliary assembly may be incorporated into the drive arrangement in such a way that, when the drive connection between the axial differential transmission and the reduction stage is canceled and the motor vehicle is in the overrun mode, the auxiliary assembly can be driven by the axial differential transmission. This makes it possible in an advantageous manner to carry out a direct mechanical drive of the auxiliary assembly without energy conversion.

Furthermore, the switching element and the auxiliary assembly are also integrated into the drive arrangement in such a way that, when the drive connection between the axial differential transmission and the reduction stage is canceled and the motor vehicle is stationary, the auxiliary assembly can be driven by the main drive motor by means of the reduction stage.

The reduction stage is preferably constructed in such a way that it comprises an intermediate shaft. This intermediate shaft is preferably arranged to be to be offset in a parallel way from the rotor axis of the electric motor. The reduction stage is furthermore preferably constructed in such a way that it has a first gearwheel and a second gearwheel engaging therein, wherein the second gearwheel is arranged on the intermediate shaft and has a number of teeth which is greater than the number of teeth of the first gearwheel. The reduction stage thus effects a "slow" gear ratio, i.e., a speed reduction and an increase in torque. The auxiliary assembly uses the gear ratio effect of the reduction stage, especially if it is driven by the electric motor when the vehicle is stationary and the auxiliary assembly requires power and the drive train from the reduction stage to the axle differential is otherwise separated by setting a corresponding switching state of the switching element.

The switching element is preferably incorporated into the drive arrangement in such a way that it couples the intermediate shaft to the second gearwheel in a switchable manner. As an alternative thereto, or in combination with this measure, the switching element can also be designed and incorporated into the drive arrangement in such a way that it couples the intermediate shaft to an output gearwheel seated thereon in a switchable manner.

The auxiliary assembly can be designed such that it has an input shaft and is preferably arranged such that this input shaft extends coaxially to the intermediate shaft. As an alternative thereto, the auxiliary assembly can also be incorporated into the drive arrangement in such a way that the input shaft thereof is arranged to be offset in a parallel way to the intermediate shaft. The transmission coupling of the auxiliary assembly with the reduction stage then preferably takes place with the inclusion of a traction mechanism drive which, if necessary, makes a further contribution to the gear ratio.

The drive arrangement can also comprise several, in particular two auxiliary assemblies, wherein the first auxiliary assembly preferably has an input shaft which is arranged to be coaxial with the axis of the intermediate shaft and the second auxiliary assembly has a second input shaft which is arranged to be offset in a parallel way to the axis of the intermediate shaft. The auxiliary assemblies are preferably incorporated into the drive arrangement in such a way that the input shafts thereof point towards the reduction stage. The reduction stage is then preferably located axially between the main drive electric motor and the auxiliary assemblies.

The switching element is preferably designed and incorporated into the drive arrangement in such a way that it can be brought into a state, in which the drive connection between the reduction stage and the axial differential transmission is canceled and the auxiliary assembly is driven via the axial differential transmission when the vehicle is in overrun mode. For this purpose, a positive or frictional coupling device and/or a freewheel device can be provided in the switching element.

An electronic control device is provided, the switching state of the switching element being set via this control device, wherein the control device takes into account the current operating state of the vehicle and sets the switching state in accordance with a control concept that takes into account the overall energy efficiency. The control device can take into account the current or a modeled thermal state of the battery system, the heat energy requirement for heating the vehicle interior, the cooling power requirement and the energy requirement of the auxiliary assembly and, based on this input information, can then bring about switching states that have the effect that, for example, energy tapped therefrom when the vehicle is in overrun mode is used as efficiently as possible and without conversion losses to cover the energy requirements of the auxiliary assembly. The control device can take into account the speeds at which the unit would be driven if the switching element were switched through and, for example, can initially perform energy recuperation in parallel to the operation of the auxiliary assembly via the main drive motor, which is temporarily operated as a generator, and then only use the tapped power primarily for driving the auxiliary assembly when the vehicle exhibits slower coasting speeds. Mixed states can also be temporarily adjusted, in which both a direct mechanical drive of the auxiliary assemblies from the thrust power and also recuperation via the electric motor are carried out in overrun mode. The control device can in particular be designed and configured in such a way that, when the auxiliary assembly requires power, it is primarily covered by power tapping from the axial differential transmission when the vehicle is in overrun mode.

The auxiliary assembly is preferably designed such that this auxiliary assembly has an input shaft and this input shaft is arranged to be coaxial with the intermediate shaft of the reduction stage. The auxiliary assembly can be fully incorporated into the transmission housing; it can also have a housing section which encloses part of the auxiliary assembly and which then forms the housing of the auxiliary assembly in conjunction with a section of the transmission housing.

The drive arrangement can also be designed so that the input shaft of the auxiliary assembly is arranged to be offset in a parallel way from the intermediate shaft of the reduction stage. The power transfer can then be brought about by a drive train section running in the transmission housing, in particular in the form of a loop drive. The drive arrangement can also be designed in such a way that it comprises two auxiliary assemblies and one of these auxiliary assemblies is arranged with the input shaft thereof coaxial with the intermediate shaft of the reduction stage and the second auxiliary assembly is arranged to be offset in a parallel way to this axis of rotation.

The switching element is preferably designed in such a way that it can be used to establish and cancel a drive connection to the axial differential transmission. The switching element is preferably arranged between the intermediate shaft and the axial differential transmission, in particular incorporated into a gearwheel of the reduction stage.

The reduction stage can be designed as a spur gear stage, which has a spur gear which is arranged to be coaxial with the rotor axis, wherein the power transfer to the intermediate shaft is in turn preferably effected by the second spur gear.

The reduction stage can also be designed as an epicyclic gear and in turn can be designed in such a way that this offers at least two different gear ratios in a switchable manner.

As already mentioned above, it is possible to effect the kinematic coupling of the auxiliary assembly with the reduction stage via a loop drive extending into the transmission housing, wherein this loop drive is designed in particular as an oil-wetted belt drive or as a chain drive. The parallel offset of the axes of the auxiliary assembly and the intermediate shaft can also be effected by a series of laterally interlocking spur gears.

The drive arrangement can also be designed in such a way that it comprises a freewheel device and that this freewheel device allows the input shaft of the auxiliary assembly to be driven by the energy that can be tapped from the axial differential transmission when the vehicle is in overrun mode and then rotates at a higher speed than the second gearwheel of the reduction stage.

The switching element is preferably designed as a form-fit and/or friction-fit coupling switching element. The switching element can also be designed as a transmission device, the switching state of which can be adjusted by fixing/releasing a transmission element, for example a ring gear.

The reduction transmission device can also be designed as a multi-stage switchable transmission device. The drive arrangement is a purely electric drive arrangement in which the main drive power is provided by the electric motor. The drive arrangement does not include an internal combustion engine. The electric motor can advantageously be manufactured as an initially independent assembly and then connected to the transmission housing as part of the assembly of the drive arrangement. It is also possible to provide at least part of the engine housing, in particular in the form of a barrel housing section, through the transmission housing.

The axial differential transmission can be constructed in such a way that it comprises its own differential transmission housing, which is then connected directly to the housing of the reduction transmission device. It is also possible to still accommodate the axial differential transmission in the transmission housing, or to manufacture the axial differential transmission housing integrally with the housing of the reduction transmission. The engine housing can also form an integral component of the transmission housing, i.e. it can be realized in one piece therewith.

The concept allows the same assemblies such as water pump, air conditioning compressor and power steering pump to be operated in an energetically advantageous manner when the vehicle is stationary and in overrun mode. A new type of connection is proposed for the auxiliary assemblies. This consists in the connection of the auxiliary assemblies in or on the transmission in connection with "intelligent" switching elements, which makes it possible to always operate the auxiliary assemblies in the most energy-efficient mode depending on the operating status of the vehicle and/or the drive motor(s) and/or the battery charge status and/or external factors (e.g. temperature). This is ensured by the fact that, when the vehicle is moving, the auxiliary assemblies are driven via the transmission shaft. In particular, the kinetic energy of the vehicle can also be used. In addition, the mechanical drive offers significant advantages in the overall efficiency chain compared to purely electrified assemblies. When the vehicle is stationary, it is driven electrically via a direct connection to the electric motor. The connection between the assemblies and the transmission shaft is released, which reduces friction losses. This mode of operation enables the provision of comfort functions such as stationary air conditioning when the vehicle is stationary or the safeguarding of necessary functions such as operating the battery cooling circuit via a water pump for cooling after the vehicle has been parked.

The concept enables the energy consumption to be reduced by auxiliary assemblies in purely electrically driven vehicles and leads to an increase in the vehicle range.

A drive train of an electric vehicle has an electric drive machine, with a transmission and with at least one auxiliary assembly. According to the illustrations explained in more detail below, the transmission contains only the final drive and the differential. Alternatively, however, the drive arrangement can also comprise further transmission stages. The at least one auxiliary assembly is integrated into the housing of the drive unit or the transmission. The electric drive machine and the transmission are connected to one another via an intermediate shaft. The intermediate shaft drives the auxiliary assembly/assemblies. A switching element is arranged in the power flow between the electrical machine, the auxiliary assembly and the transmission and is assigned to the intermediate shaft.

The auxiliary assemblies can be arranged to be coaxially or axially parallel with the intermediate shaft of the reduction stage. In the case of an axially parallel arrangement, a geared connection between the intermediate shaft and the auxiliary assembly is formed, preferably formed by an epicyclic transmission. The drive arrangement can advantageously be constructed in such a way that it also enables an optional drive by two auxiliary assemblies, which are preferably arranged to be axially parallel to one another and coupled via a geared operative connection.

At least one auxiliary assembly integrated either in the drive unit or in the transmission is coupled to the electric drive machine via a switching element. At least two, preferably three "paths" can be switched by means of this switching element. Only the axle differential is supplied with power via the first path. The power from the electric motor flows via a second path by means of the reduction stage to the auxiliary assembly (when the vehicle is stationary). Power flows from the differential to the auxiliary assembly via the third path (drive via the transmission shaft when the vehicle is in overrun mode).

The concept can be implemented in different embodiments. The axes of the intermediate shaft and the auxiliary assembly can be arranged to be coaxial with one another or axially parallel. In the case of the axially parallel arrangement, there is a geared connection between the reduction stage and the rotor axis of the auxiliary assembly. A second or further auxiliary assembly is optionally arranged to be coaxially or axially parallel to one another and connected to one another via a further geared stage. Auxiliary assemblies arranged to be axially parallel to one another can, for example, be connected to one another by means of a traction mechanism drive.

BRIEF DESCRIPTION OF THE DRAWINGS

Further details and features emerge from the following description in conjunction with the drawing. It can be seen that.

DETAILED DESCRIPTION

Figure 1:
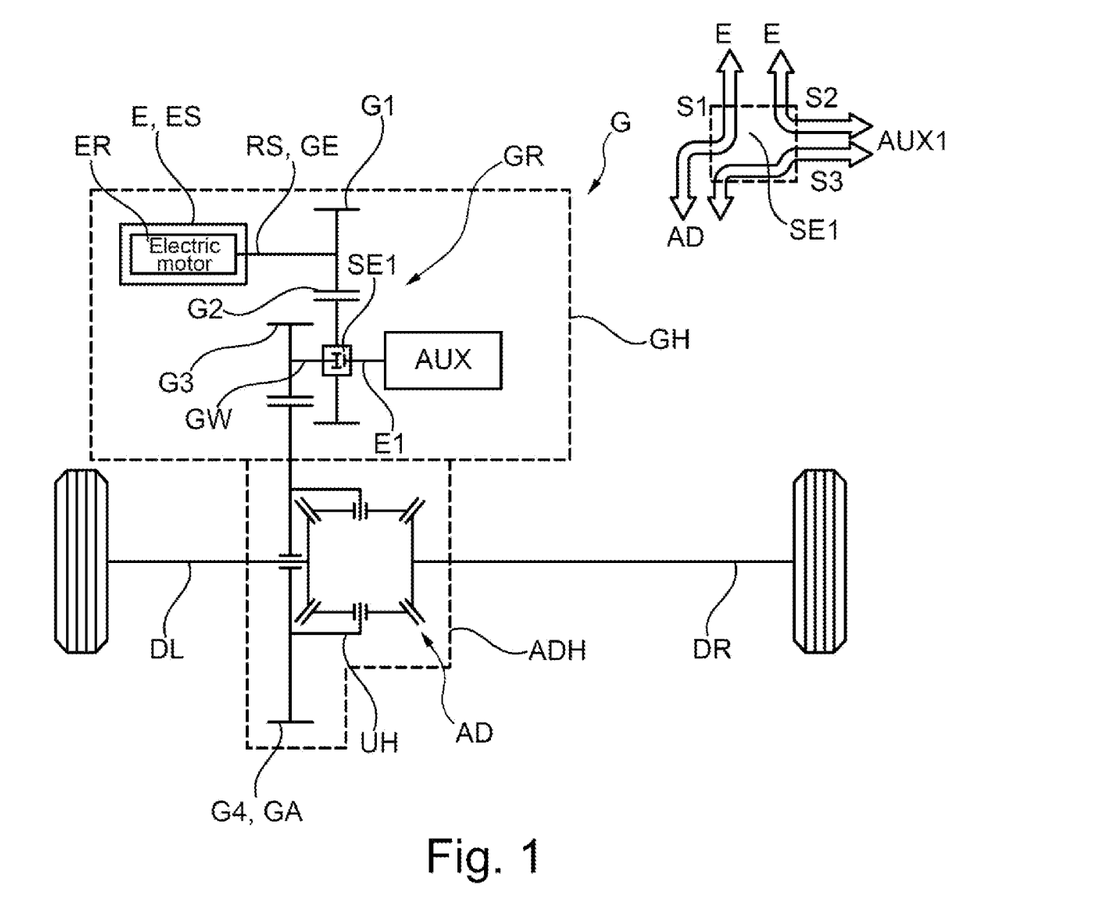
FIG. 1 shows a first schematic representation to illustrate the structure of an electromechanical drive arrangement having an auxiliary assembly incorporated into the transmission housing and thus arranged to be coaxial with the intermediate shaft of the reduction transmission as well as a switching element integrated into the transmission, for the selective coupling of the auxiliary assembly with the reduction stage and preferably also with the drive train section leading to the axle differential.

The representation according to FIG. 1 shows an electromechanical drive arrangement having an electromechanical main drive motor E comprising a rotor ER and a stator ES, a reduction transmission device G which comprises a transmission input GE, a transmission output GA, at least one reduction stage GR and a transmission housing GH which accommodates the reduction stage GR, an axial differential transmission AD, for splitting the drive power present at the outlet of the reduction transmission device GR between a first and a second wheel drive train section DL, DR, and an auxiliary assembly AUX which can be driven by the main drive motor E. The auxiliary assembly AUX can in particular be an air conditioning compressor, a power steering pump, a delivery module of a brake system or a cooling water pump for cooling a battery assembly and for circulating a fluid for heating the vehicle interior of a corresponding motor vehicle.

The auxiliary assembly AUX is incorporated into the drive arrangement in such a way that it can be driven by the main drive motor E by means of the reduction stage GR. The auxiliary assembly AUX is completely incorporated into the transmission housing GH. A switching element SE1 is provided in the transmission housing GH. This switching element SE1 is designed and incorporated into the drive arrangement in such a way that the drive connection from the reduction stage GR to the axial differential transmission AD can be closed in a switchable manner and can be disconnected in a switchable manner by means of said switching element. (Coupling function S1 in FIG. 4).

The switching element SE1 and the auxiliary assembly AUX are incorporated into the drive arrangement in such a way that, when the drive connection between the axial differential transmission AD and the reduction stage GR is canceled and the motor vehicle is in the overrun mode, the auxiliary assembly can be driven by the axial differential transmission. (Coupling function S3 in FIG. 4)

In addition, the switching element (SE1) and the auxiliary assembly AUX are also integrated into the drive arrangement in such a way that, when the drive connection between the axial differential transmission AD and the reduction stage GR is canceled and the motor vehicle is stationary, the auxiliary assembly AUX can be driven by the main drive motor E by means of the reduction stage GR. (Coupling function S2 in FIG. 4)

The reduction stage GR comprises an intermediate shaft GW, as well as a first gearwheel G1 and a second gearwheel G2 engaging therein. The second gearwheel G2 is arranged on the intermediate shaft GW and has a number of teeth that is greater than the number of teeth of the first gearwheel G1, so that the reduction stage GR brings about a reduction in speed.

The switching element SE1 is designed here so that it couples the intermediate shaft GW with the second gearwheel G2 in a switchable manner. Alternatively, it is also possible to design the switching element SE1 in such a way that it couples the intermediate shaft GW with an output gearwheel G3 seated thereon in a switchable manner. This output gearwheel G3 of the intermediate shaft GW engages radially from the outside into a large gearwheel G4, which here is directly coupled to the epicyclic housing UH of the axial differential transmission AD in a torsionally rigidly manner.

The auxiliary assembly AUX has an input shaft E1 and this input shaft E1 is arranged to be coaxial with the axis of the intermediate shaft GW. The drive arrangement is characterized in that the auxiliary assembly AUX is at least partially incorporated into the transmission housing GH, a switching element SE1 is provided in the transmission housing GH and the switching element SE1 is designed and incorporated into the drive arrangement in such a way that the drive connection extending by means of the reduction stage GR between the rotor ER and the axial differential transmission AD can be closed and disconnected in a switchable manner by means of said switching element and thus the auxiliary assembly AUX can be driven selectively via the rotor ER, if the drive connection between the rotor ER and the axial differential transmission AD is canceled.

In the drive arrangement, the auxiliary assembly AUX has an input shaft E1 and this input shaft E1 is arranged to be coaxial with the axis of the intermediate shaft. The switching element SE1 is also arranged to be coaxial with the axis of rotation of the intermediate shaft and switches the output torque thereof to an output of the switching element or causes a decoupling.

The switching element SE1 is designed in such a way that it can be used to establish a drive connection to the axial differential transmission AD. The switching element SE1 is incorporated directly into the reduction stage GR in this exemplary embodiment. The reduction stage GR is designed here as a spur gear stage and the switching element SE1 enables a second spur gear G2, which is larger in terms of the diameter thereof, to be coupled to the intermediate shaft GW. For this purpose, the switching element SE1 is designed as a form-fit or friction-fit coupling switching element SE. The actuators provided for adjusting the respective switching state are not shown here; they can be integrated into the switching element and, in particular, be designed as electromagnetic or fluid-mechanical actuators.

The electric motor E, the reduction transmission G and the auxiliary assembly AUX are incorporated into a common housing device GH, the axial differential transmission AD is connected to this housing device GH or is also integrated thereinto. The axial differential transmission is housed in a differential housing ADH. This can be formed integrally with the transmission housing GH or attached thereto.

In the drive arrangement, the transmission G is connected on the input side to at least one electric drive motor E and on the output side to at least one vehicle axle DL, DR. The transmission G comprises one or more shafts in which a planetary gear set can be integrated or which are connected to one another with spur gear stages or planetary gear sets. On the intermediate shaft, which is the reduction stage, the auxiliary assembly AUX, such as an air conditioning compressor, a water pump, or the like, is fastened to be coaxial therewith.

Figure 2:
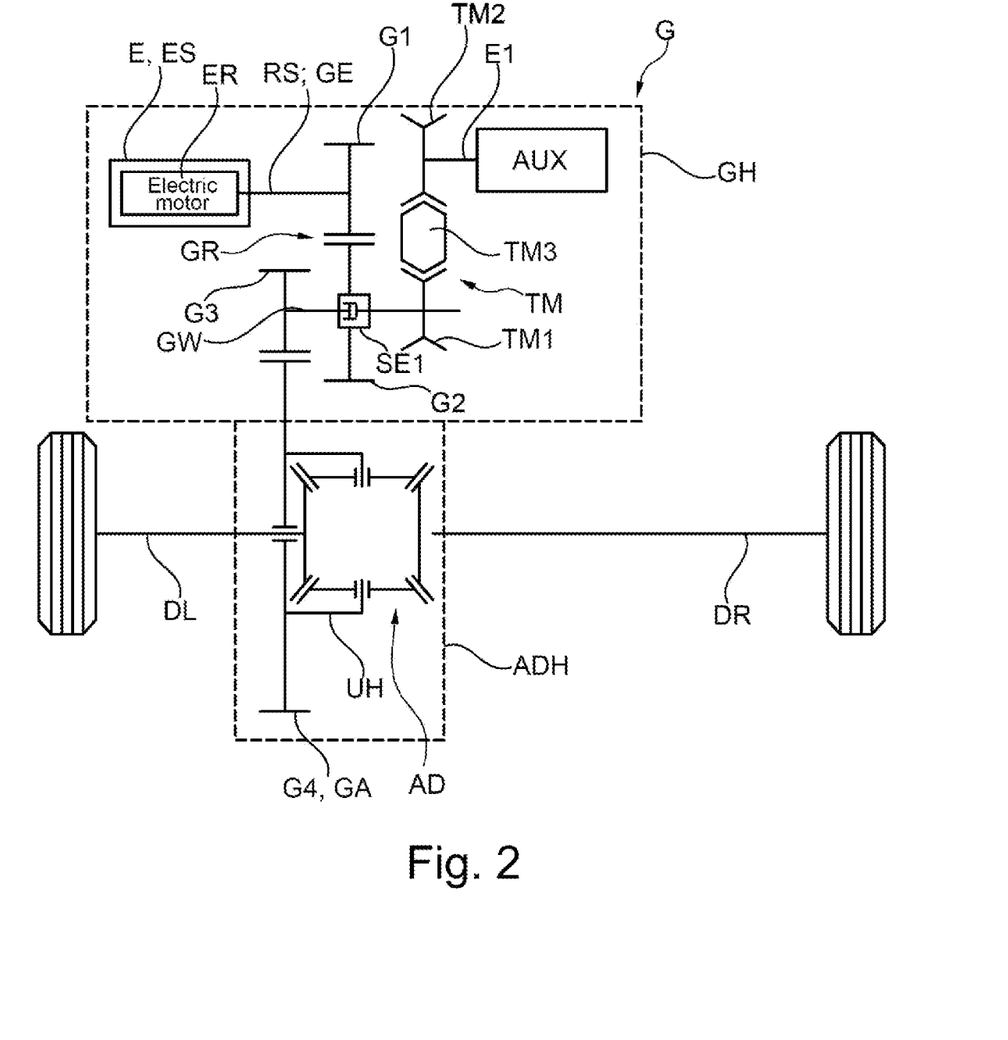
FIG. 2 shows a second schematic representation to illustrate the structure of an electromechanical drive arrangement, also having an auxiliary assembly incorporated into the transmission housing, and a switching element intended for the selective coupling thereof with the intermediate shaft of the reduction transmission and the drive train section leading to the axle differential and integrated into the transmission, wherein the auxiliary assembly is arranged to be offset in an axially parallel manner with respect to the intermediate shaft.

The representation according to FIG. 2 in turn shows an electromechanical drive arrangement having an electromechanical main drive motor E comprising a rotor ER and a stator ES, a reduction transmission device G which comprises a transmission input GE, a transmission output GA, at least one reduction stage GR and a transmission housing GH which accommodates the reduction stage GR, an axial differential transmission AD, for splitting the drive power present at the outlet of the reduction transmission device between a first and a second wheel drive train section DL, DR, and an auxiliary assembly AUX which can be driven by means of the reduction stage GR by the main drive motor E.

This drive arrangement is also characterized in that the auxiliary assembly AUX is fully or at least partially incorporated into the transmission housing GH, a switching element SE1 is provided in the transmission housing GH and the switching element SE1 is designed and incorporated into the drive arrangement in such a way that the drive connection between the reduction stage GR and the axial differential transmission AD can be closed and disconnected in a switchable manner by means of said switching element and thus the auxiliary assembly AUX can also be driven by means of the reduction stage GR, if the drive connection between the reduction stage GR and the axial differential transmission AD is canceled.

In this variant, the auxiliary assembly AUX is incorporated into the drive arrangement in such a way that the input shaft E1 of the auxiliary assembly AUX is offset in a parallel way from the axis of the intermediate shaft GW of the reduction stage GR. This is achieved here by a traction mechanism drive TM. This comprises a first traction mechanism wheel TM1 and a second traction mechanism wheel TM2 as well as a traction mechanism TM3 designed as a belt or chain. The first traction mechanism wheel TM1 is arranged to be coaxial with the axis of the intermediate shaft and can be coupled in a switchable manner via the switching element SE1 to the intermediate shaft or the second spur gear G2 of the reduction stage.

The switching element SE1 is incorporated into the reduction stage GR, in particular the second spur gear G2 of same. The reduction stage GR comprises two spur gears G1, G2. The first spur gear G1 is driven by the rotor shaft RS of the electric motor and engages radially from the outside into the second spur gear G2 of the reduction stage GR. The further transfer of power from the reduction stage GR takes place via a third spur gear G3 that is seated on the intermediate shaft. This third spur gear G3 engages in a fourth spur gear G4, which forms the large or crown gearwheel of the axial differential transmission AD and for this purpose is connected to the epicyclic housing UH or web of the axial differential transmission AD in a torsion-proof manner. The switching element SE1 passes power to the auxiliary assembly AUX. This passage can be switched, i.e. can be closed and separated, via the switching element SE1.

Figure 3:
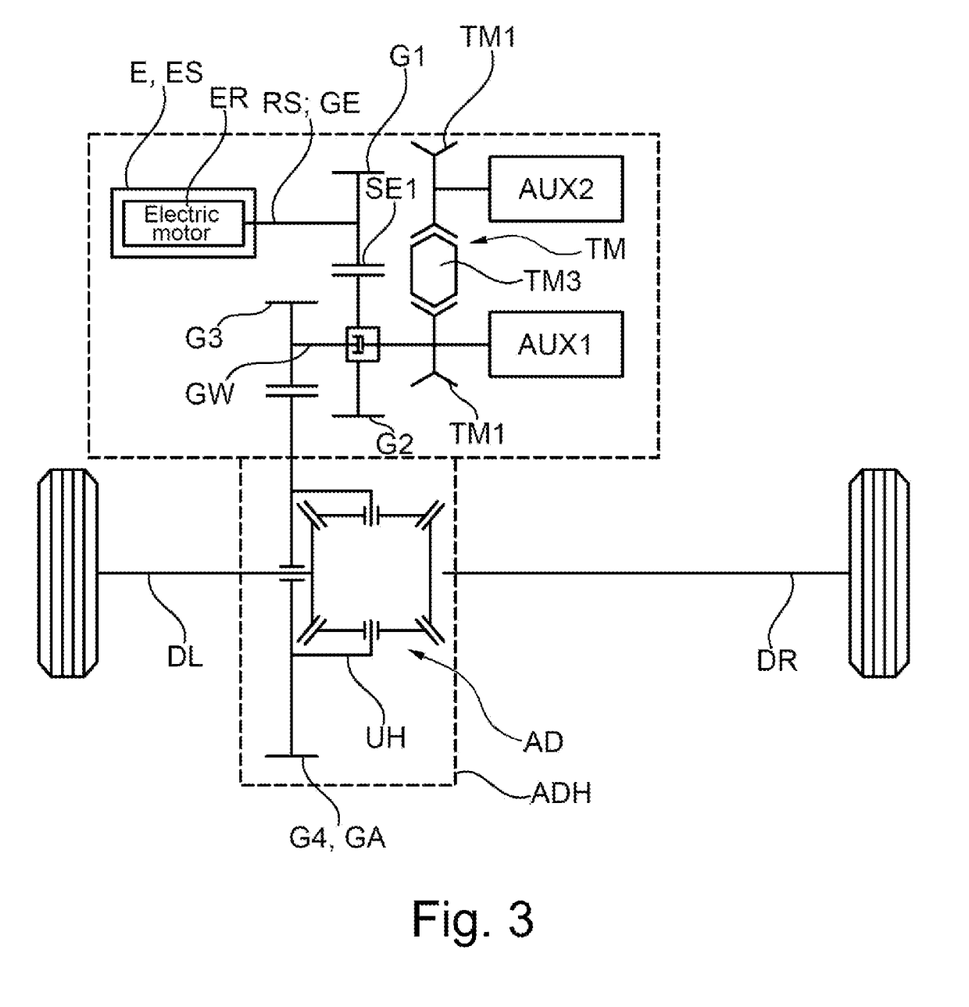
FIG. 3 shows a third schematic representation to illustrate the structure of an electromechanical drive arrangement having two auxiliary assemblies incorporated into the transmission housing, as well as a transmission-internal switching element provided for the selective coupling thereof with the reduction stage and the drive train section leading to the axle differential, wherein one of the auxiliary assemblies is coaxial with the axis of the intermediate shaft and the further auxiliary assembly is arranged to be offset therefrom in an axially parallel manner.

The exemplary embodiment according to FIG. 3 shows a third variation of an electromechanical drive arrangement having an electromechanical main drive motor E comprising a rotor ER and a stator ES, a reduction transmission device G which comprises a transmission input GE, a transmission output GA, at least one reduction stage GR and a transmission housing GH which accommodates the reduction stage GR, an axial differential transmission (AD) for splitting the drive power, which is present at the output of the reduction transmission device between a first and a second wheel drive train section DL, DR, and a first auxiliary assembly AUX1 and a second auxiliary assembly AUX2, which can both be driven by the main drive motor E by means of the reduction stage GR.

This drive arrangement is characterized in that the two auxiliary assemblies AUX1, AUX2 are fully or at least partially incorporated into the transmission housing GH and a switching element SE1 is provided in the transmission housing GH and in that the switching element SE1 is designed and incorporated into the drive arrangement in such a way that the drive connection between the second gearwheel G2 of the reduction stage and the axial differential transmission AD can be closed and disconnected in a switchable manner by means of said switching element and the auxiliary assemblies AUX1, AUX2 can also be driven by means of the reduction stage GR where necessary, if the drive connection between the rotor ER and the axial differential transmission AD is canceled.

In this variant, the auxiliary assembly AUX1 has an input shaft E1 and this input shaft E1 is arranged to be coaxial with the axis of rotation of the intermediate shaft GW. The auxiliary assembly AUX2 is incorporated into the drive arrangement in such a way that the input shaft E2 of the auxiliary assembly AUX2 is offset in a parallel way from the axis of the intermediate shaft. This is achieved in turn here by a traction mechanism drive TM. This comprises a first traction mechanism wheel TM1 and a second traction mechanism wheel TM2 as well as a traction mechanism TM3 designed as a belt or chain. The first traction mechanism wheel TM1 is arranged to be coaxial with the rotor axis X and can be coupled in a switchable manner to the rotor shaft or the first spur gear G1 of the reduction stage via the switching element SE1.

The switching element SE1 is both actively couplable or releasable, for example as a magnetic clutch, as a multi-disc clutch, and passively, for example as a freewheel. At the same time, this one switching element SE1 enables the electric motor and the auxiliary assembly to be decoupled, independently of one another or at the same time, from the transmission and thus from the drive train of the vehicle. This functional integration reduces the number of components to a minimum.

The switching element SE1 can contain constant or variable gear ratio/reduction ratios, such as a planetary transmission set. The switching element SE1 can simultaneously have a damping or decoupling effect on the drive train and/or assemblies, for example by means of a spring damper element similar to a dual mass flywheel. The switching element SE1 can, for example, also be incorporated into the interior of a gearwheel of the transmission stage GR.

Figure 4:
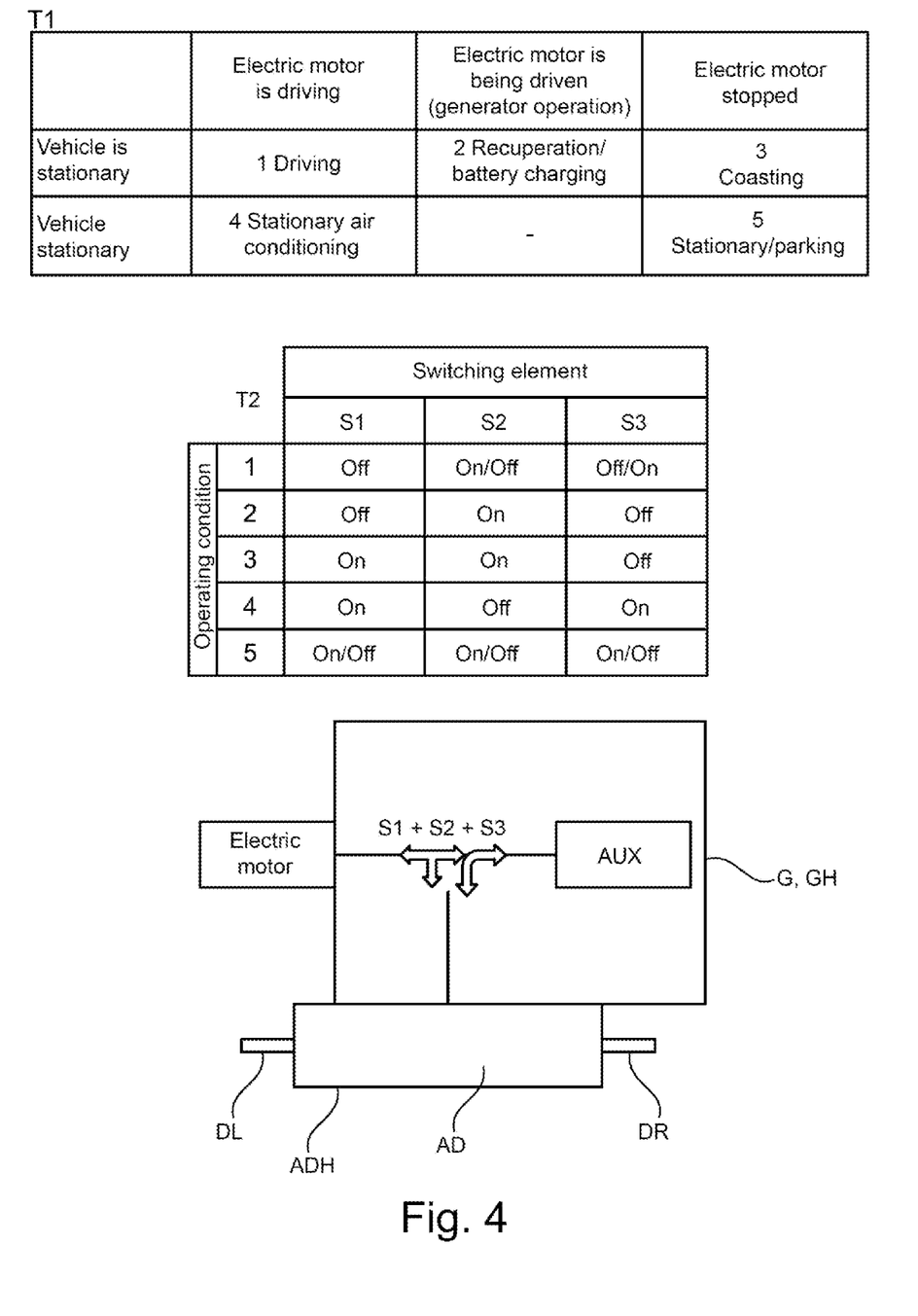
FIG. 4 shows a fourth schematic representation to illustrate the mode of operation and the switching states of the drive arrangement in different vehicle operating states.

The representation according to FIG. 4 illustrates the mode of operation of the drive arrangement in connection with selected vehicle operating states. The switching element SE1 is designed here in such a way that it can provide three coupling functions S1, S2, S3. The first coupling function S1 enables a power transfer from the electric motor E to the axle differential AD. The second coupling function enables a power transfer from the electric motor E to the auxiliary assembly AUX. The third coupling function enables a power transfer from the axle differential AD to the auxiliary assembly AUX. The setting of the coupling functions S1, S2, S3 of the switching element SE is illustrated in accordance with the different operating states of a motor vehicle via tables T1 and T2, where "closed" means coupling and "open" means disconnection.

In the operating state 1 specified in table T1, the electric motor E is active and the switching element SE1 provides the coupling function S1, according to which the torque of the rotor shaft is fed to the axle differential via the reduction transmission stage GR. If the auxiliary assembly AUX is to be active in this state, the coupling functions S2 and/or S3 are also provided.

When the vehicle is in overrun mode in accordance with operating state 2 in table T1 and there is excess thrust power, the coupling function S1 and the coupling function S3 are adjusted via the switching element SE. A power conversion now takes place via the electric motor E in the recuperation operating mode and, in addition, a mechanical drive of the auxiliary assembly AUX takes place directly by power tapping from the axle differential AD.

In what is termed sailing operation, that is, the vehicle continues to run smoothly without the desired significant braking effect according to operating state 3 in table T1, the coupling functions S1, S2 are canceled and only the coupling function S3 is activated. The auxiliary assembly AUX1 is now driven directly through the axle differential AD without any electrical power consumption.

When the vehicle is stationary according to operating state 4 in table T1, the coupling functions S1 and S3 are deactivated and the auxiliary assembly is driven directly by the electric motor E via the coupling function S2.

When the vehicle is stationary without the auxiliary assembly AUX requiring action, for example when parking, the electric motor E is switched off. In this state, the switching element SE1 can assume any state, since in this state no specific coupling function is required. However, it is also possible here to activate the coupling functions S1 and S3 to bring about a slightly increased holding torque, a braking effect in the event of unintentional rolling and, if necessary, an active braking effect by controlling the electric motor E.

The coupling functions S1, S2 can be implemented via a form-fit coupling switching element or appropriately activatable clutches. The coupling function S3 can also be achieved by freewheeling and thus arises automatically when the vehicle is in overrun mode.

The drive arrangement is aimed at a new type of connection of the auxiliary assemblies. The connection of the auxiliary assemblies occurs in this way in or on the transmission in connection with "intelligent" switching elements, which makes it possible to always operate the auxiliary assemblies in the most energy-efficient mode depending on the operating status of the vehicle and/or the drive motor(s) and/or the battery charge status and/or external factors (e.g. temperature).

This is ensured by the fact that, when the vehicle is moving, the auxiliary assemblies are driven via the transmission shaft. In particular, the kinetic energy of the vehicle can also be used. In addition, the mechanical drive generally offers significant advantages in the overall efficiency chain compared to purely electrified assemblies. When the vehicle is stationary, it is driven electrically via a direct connection to the electric motor. The connection between the assemblies and the transmission shaft is released, which reduces friction losses. This mode of operation enables the provision of comfort functions such as stationary air conditioning when the vehicle is stationary or the safeguarding of necessary functions such as operating the battery cooling circuit via a water pump for cooling after the vehicle has been parked.

The drive arrangement comprises a transmission which is connected on the input side to at least one electric drive motor and on the output side to at least one vehicle axle. The transmission consists of a drive shaft, at least one intermediate shaft and one or more output shafts. The transmission can contain one or more planetary transmission sets and/or spur gear stages. An auxiliary assembly such as an air conditioning compressor, water pump, or the like, is connected to be coaxial with and parallel to the intermediate shaft (FIG. 1). However, a connection is also possible, for example by means of a belt or chain drive, one of the drive wheels or one of the drive pulleys being connected coaxially and the traction mechanism drive being arranged to be axially parallel to the intermediate shaft (FIG. 2). If necessary, the chain or belt drives can be equipped with conventional guide and/or tensioning rails or deflection and/or tensioning rollers.

The connection of the assembly to the intermediate shaft and the combination described here with a shift element has the advantage that the intermediate shaft can be designed as a complete and independent module and the design/construction of the rest of the transmission is not influenced by the connection of an assembly. For example, a retrofitting or only an optional equipping is possible. In addition, the speed of the intermediate shaft is lower than that of the electric motor or transmission input shaft, so that the assembly can be operated with less friction than when connected to the transmission input shaft. The electric machine and auxiliary assembly/assemblies are integrated into the transmission housing, which enables a space-saving design and avoids additional seals on the shafts.

The intermediate shaft is also equipped with a switching element, which makes it possible to decouple both the electric motor and the auxiliary assembly, independently of one another or simultaneously, from the transmission and thus from the vehicle's drive train. With complete decoupling from the drive train, there is still a connection between the electric motor and auxiliary assembly.

The switching element can be both actively, for example magnetic coupling, and passively, for example freewheeling, coupled or detached. The switching element can contain constant or variable gear ratio/reduction ratios, such as a planetary transmission set. The switching element can simultaneously have a damping or decoupling effect on the drive train and/or assemblies, for example by means of a spring damper element similar to a DMF. The switching element can, for example, also be integrated into a gearwheel of the intermediate shaft. The switching states of the element corresponding to the different operating states are explained in more detail in FIG. 4 for an example.

The coaxially connected auxiliary assembly can also be connected to further auxiliary assemblies, for example by means of a chain or toothed belt drive (FIG. 3). In this case, all connected auxiliary assemblies can additionally have a further coupling and/or damping and/or decoupling element on the drive shaft thereof. This enables individual operation of each individual assembly depending on the operating state of the vehicle and depending on the other elements. At the same time, the assembly can be decoupled from torsional vibrations of the drive train, which ensures more uniform and efficient operation and/or avoids possible negative effects of the connection process on the drive train and thus indirectly on the vehicle.

The invention claimed is:

1. An electromechanical drive arrangement for a motor vehicle, the electromechanical drive arrangement comprising:
   an electromechanical main drive motor comprising a rotor and a stator,
   a reduction transmission device which comprises a transmission input, a transmission output, at least one reduction stage and a transmission housing which accommodates the reduction stage,
   an axial differential transmission for splitting the drive power between a first and a second wheel drive train section, and
   an auxiliary assembly which is driven by the main drive motor via the reduction stage, wherein
   the auxiliary assembly is at least partially incorporated into the transmission housing,
   a switching element is provided in the transmission housing,
   the switching element is designed and incorporated into the drive arrangement in such a way that the drive connection from the reduction stage to the axial differential transmission can be closed in a switchable manner and can be disconnected in a switchable manner by means of said switching element.

2. The drive arrangement according to claim 1, wherein the switching element and the auxiliary assembly are incorporated into the drive arrangement in such a way that, when the drive connection between the axial differential transmission and the reduction stage is canceled and the motor vehicle is in an overrun mode, the auxiliary assembly can be driven by the axial differential transmission.

3. The drive arrangement according to claim 1, wherein the switching element and the auxiliary assembly are integrated into the drive arrangement in such a way that, when the drive connection between the axial differential transmission and the reduction stage is canceled and the motor vehicle is stationary, the auxiliary assembly can be driven by the main drive motor by means of the reduction stage.

4. The drive arrangement according to claim 1, wherein the reduction stage comprises an intermediate shaft.

5. The drive arrangement according to claim 4, wherein the reduction stage has a first gearwheel and a second gearwheel engaging therein, the second gearwheel being arranged on the intermediate shaft and having a number of teeth which is greater than the number of teeth of the first gearwheel.

6. The drive arrangement according to claim 5, wherein the switching element couples the intermediate shaft with the second gearwheel in a switchable manner.

7. The drive arrangement according to claim 4, wherein the switching element couples the intermediate shaft with an output gearwheel seated thereon in a switchable manner.

8. The drive arrangement according to claim 4, wherein the auxiliary assembly has an input shaft arranged to be coaxial with the intermediate shaft.

9. The drive arrangement according to claim 4, wherein a first auxiliary assembly and a second auxiliary assembly are provided, wherein the first auxiliary assembly has an input shaft which is arranged to be coaxial with the axis of the intermediate shaft and the second auxiliary assembly has a second input shaft which is arranged to be offset in a parallel way to the axis of the intermediate shaft.

10. The drive arrangement according to claim 1, wherein the auxiliary assembly is incorporated into the drive arrangement in such a way that an input shaft thereof points towards the reduction stage.

11. The drive arrangement according to claim 4, wherein the auxiliary assembly has an input shaft arranged to parallel to and offset from the intermediate shaft.

12. An electromechanical drive arrangement comprising:
an electromechanical main drive motor having a rotor and a stator;
a reduction transmission device having a transmission input driven by the rotor, a transmission output, at least one reduction stage and a transmission housing which accommodates the reduction stage;
an axial differential transmission selectively driven by the transmission output and configured to split drive power between a first and a second wheel drive train section;
an auxiliary assembly which is driven by the main drive motor via the reduction stage and which is at least partially incorporated into the transmission housing; and
a switching element configured to selectively establish a drive connection between the reduction stage and the axial differential transmission.

13. The drive arrangement according to claim 12, wherein the switching element is further configured to establish a drive connection from the axial differential transmission to the auxiliary assembly while disconnecting the drive connection between the reduction stage and the axial differential transmission.

14. The drive arrangement according to claim 13, wherein the drive connection from the axial differential transmission to the auxiliary assembly is passively established during an overrun mode.

15. The drive arrangement according to claim 12, wherein the switching element is further configured to establish a drive connection from the reduction stage to the auxiliary assembly while disconnecting the drive connection between the reduction stage and the axial differential transmission.

16. The drive arrangement according to claim 12, wherein the reduction stage has a first gearwheel and a second gearwheel engaging therein, the second gearwheel being arranged on an intermediate shaft and having a number of teeth which is greater than the number of teeth of the first gearwheel.

17. The drive arrangement according to claim 16, wherein the switching element selectively couples the intermediate shaft to the second gearwheel.

18. The drive arrangement according to claim 16, wherein the switching element selectively couples the intermediate shaft with an output gearwheel seated thereon.

\* \* \* \* \*